United States Patent [19]

Morishita et al.

[11] Patent Number: 4,754,830
[45] Date of Patent: Jul. 5, 1988

[54] MOTOR-DRIVEN POWER STEERING SYSTEM FOR A VEHICLE

[75] Inventors: Mitsuharu Morishita; Shinichi Kohge, both of Himeji, Japan

[73] Assignee: Mitsubishi Denki Kabushiki Kaisha, Japan

[21] Appl. No.: 21,207

[22] Filed: Mar. 3, 1987

[30] Foreign Application Priority Data

Mar. 19, 1986 [JP] Japan ................................. 61-63491

[51] Int. Cl.$^4$ ............................................. B62D 5/04
[52] U.S. Cl. .................................. 180/79.1; 74/388 PS
[58] Field of Search ....................... 180/79.1, 142, 148; 74/388 PS

[56] References Cited

U.S. PATENT DOCUMENTS 4,538,698  9/1985  Hashimoto et al. ............... 180/79.1

Primary Examiner—John A. Pekar
Attorney, Agent, or Firm—Leydig, Voit & Mayer

[57] ABSTRACT

A motor-driven power steering system for a vehicle having a torque sensor for detecting operator-induced steering torque resulting from steering force exerted on a steering wheel by an operator and generating a voltage signal representative thereof and a motor having a field coil and an armature and connected to transmit a rotating force to said steerable road wheels for power-assisting steering motion caused by the operator through the steering wheel. Electric switching elements are interposed between a battery and the field coil of the motor for controlling current to be supplied to said field coil so as to change the rotational direction of said motor, and a control means connected to receive the voltage signal of the torque sensor for controlling the operation of the electric switching elements.

16 Claims, 4 Drawing Sheets

MOTOR-DRIVEN POWER STEERING SYSTEM FOR A VEHICLE

BACKGROUND OF THE INVENTION

1. Field of the Invention

This invention relates to a motor-driven power steering system for a vehicle adapted to assist the operator-induced steering operation by means of the rotating force of a motor.

2. Description of the Prior Art

In the past, a conventional power steering system of this type, as schematically illustrated in FIG. 6, has hitherto been known in which a steering wheel 1 is operatively connected through a steering shaft 2 and a first rack and pinion gear $T_1$ including a first pinion 5 and a first rack tooth portion 6a with a steering rack 6 which is connected at its opposite ends with a pair of steerable road wheels (not shown) through a pair of tie rods 8a, 8b so that when the steering wheel 1 is turned by an operator, the steerable road wheels (not shown) are appropriately steered in accordance with the steering motion of the steering wheel 1 induced by the operator. On the other hand, the steering rack 6 is operatively connected with a motor 13 through a second rack and pinion gear $T_2$ including a second rack tooth portion 6b and a second pinion 18 and a speed-reduction gear R so that the driving force of the motor 13 is transmitted through the speed-reduction gear R and the second rack and pinion gear $T_2$ to the rack 6 so as to assist the operator-induced steering operation of the steering wheel 1. The motor 13 is electrically connected with a battery 11 through a control unit 9 and a key or ignition switch 12 so that it is energized by the battery 11 under the control of the control unit 9. The control unit 9 is input with control signals from a steering-torque sensor 3 and a vehicle-speed sensor 10 so as to appropriately control the operation of the motor 13 on the basis of the steering torque and the vehicle speed measured.

As shown in FIG. 7, the control unit 9 includes four electrical switching elements 9a through 9d such as, for example, power transistors, power MOS FETs, or the like for controlling the current supplied from the battery 11 to an armature of the motor 13 so as to change the rotational direction of the motor 13, and a control means 9e connected to receive the outputs from the torque sensor 3 and the vehicle-speed sensor 10 for controlling the switching operations of the electrical switching elements 9a through 9d. With this arrangement, the switching elements 9a through 9d have to control the large flow of current supplied to the armature of the motor 13, which is, for example, about 50 to 80 amperes at the time of motor energization, and about 10 to 20 amperes during steady-state operation of the motor 13. Therefore, the conventional power steering system as described above is disadvantageous in that the switching elements must necessarily be costly and large-sized.

SUMMARY OF THE INVENTION

In view of the above, the present invention has the objective of overseeing the above-described disadvantages of the prior art, and has for its main object the provision of a novel and improved motor-driven power steering system for a vehicle in which electrical switching elements for controlling the supply of current to a power-assisting motor can be manufactured at low cost and reduced size.

In order to achieve the above object, according to one aspect of the present invention, there is provided a motor-driven power steering system for a vehicle having a steering wheel operatively connected to steer steerable road wheels, the motor-driven power steering system comprising:

a torque sensor connected to detect operator-induced steering torque resulting from steering force exerted on the steering wheel by an operator and generating a signal representative thereof;

a motor having a field coil and an armature being energized by a battery to transmit a force to the steerable road wheels for power-assisting steering motion caused by the operator through the steering wheel;

an electric switching means interposed between the battery and the field coil of the motor for controlling current to be supplied to the field coil so as to change the rotational direction of the motor; and a control means connected to receive the voltage, signal from the torque sensor for controlling switching operation of the electric switching means.

According to another aspect of the present invention, there is provided a motor-driven power steering system for a vehicle comprising:

a steering wheel;

a steering shaft fixedly connected with the steering wheel for integral rotation therewith;

a speed sensor for detecting travelling speed of a vehicle and generating an output signal representative of the detected vehicle speed;

a torque sensor mounted on the steering shaft for detecting operator-induced steering torque resulting from steering force exerted on to the steering wheel by an operator and generating an output signal representative of the detected steering torque;

a first pinion operatively connected with the steering shaft and adapted to be driven by the steering wheel through an intermediary of the steering shaft;

a rack operatively connected through tie rods with a pair of steerable road wheels and having a first rack tooth portion and a second rack tooth portion formed thereon, the first rack tooth portion being in meshing engagement with the first pinion;

a second pinion being in meshing engagement with the second rack tooth portion on the rack;

a motor having a field coil and an armature and operatively connected through a speed-reduction gear with the second pinion to transmit a rotating force to the steerable road wheels for power assisting steering motion of the rack induced by the operator through an intermediary of the steering wheel, the steering shaft, the first pinion and the first rack tooth portion the field coil of the motor having first and second ends and being energized by a battery;

a first electromagnetic sliding clutch interposed between the motor and the second pinion for transmitting power therebetween substantially in proportion to the current supplied thereto;

a second electromagnetic clutch interposed between the motor and the second pinion for selectively establishing and interrupting the operative connection between the motor and the second pinion;

an electric switching means interposed between the battery and the field coil of the motor for controlling current to be supplied to the field coil so as to change rotational direction of the motor; and a control means connected to receive output signals of the speed sensor and the torque sensor for controlling the operations of the motor, the electric switching means, the first clutch and the second clutch.

It is preferable that the electric switching means comprise:

a first electric switching element connected at an input side to a positive terminal of the battery and at an output side to the first end of the field coil;

a second electric switching element connected at an input side to the positive terminal of the battery and at an output side to the second end of the field coil;

a third electric switching element connected at an input side to the second end of the field coil and at an output side to a negative terminal of the battery; and a fourth electric switching element connected at an input side to the first end of the field coil and at an output side to the negative terminal of the battery;

whereby the first and third electric switching elements are simultaneously energized and deenergized by the control means, and the second and fourth electric switching elements are simultaneously energized and deenergized alternatively with respect to the first and third electric switching elements by the control means.

In one embodiment, each of the electric switching elements comprises a power transistor.

In another embodiment, each of the electric switching elements comprises a power MOS FET.

Preferably, the control means is interposed between the first and second electric switching elements and the positive terminal of the battery.

A control electric switching means may also be interposed between the armature of the motor and the battery, and controlled by the control means for controlling the current to be supplied to the armature.

The above and other objects, features and advantages of the present invention will become apparent from the following detailed description of several presently preferred embodiments of the invention when taken in conjunction with the accompanying drawings.

BRIEF DESCRIPTION OF THE DRAWINGS

FIGS. 1 through 6 is related to a motor-driven power steering system in accordance with the present invention, in which FIG. 1 is a schematic view illustrating a general arrangement of the same;

FIG. 2 is a block diagram showing a control circuit for controlling the operation of a power-steering motor;

FIG. 3 is a characteristic view showing a relationship between clutch current and transmission torque of a first electromagnetic sliding clutch;

FIG. 4 is a characteristic view showing a relationship between steering torque and motor voltage and a relationship between steering torque and first-clutch current; and FIG. 5 is a characteristic view showing a relationship between vehicle speed and first-clutch current and a relationship between vehicle speed and second-clutch current.

FIG. 6 is a view similar to FIG. 1, but showing a conventional motor-driven power steering system.

DESCRIPTION OF THE PREFERRED EMBODIMENTS

Figure 6:
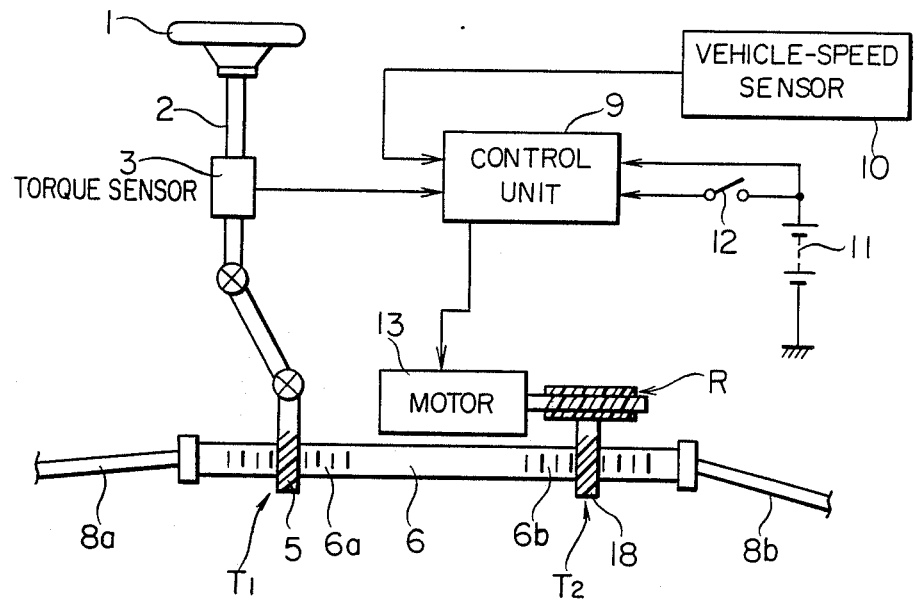
Figure 7:
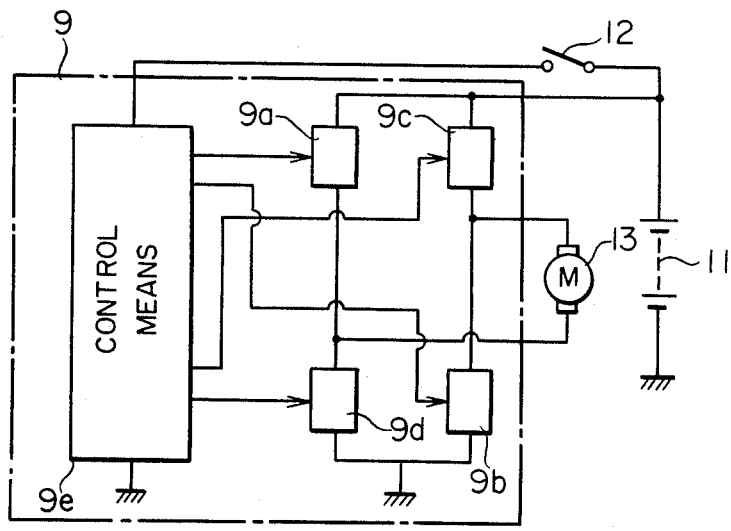
FIG. 7 is a view similar to FIG. 2, showing a conventional control circuit of the power steering system illustrated in FIG. 6.

The present invention will now be described in detail with reference to a presently preferred embodiment thereof as illustrated in the accompanying drawings. In the following, the same parts or elements of this embodiment will be identified by the same reference numerals and reference characters as employed in the prior art shown in FIGS. 6 and 7.

Figure 1:
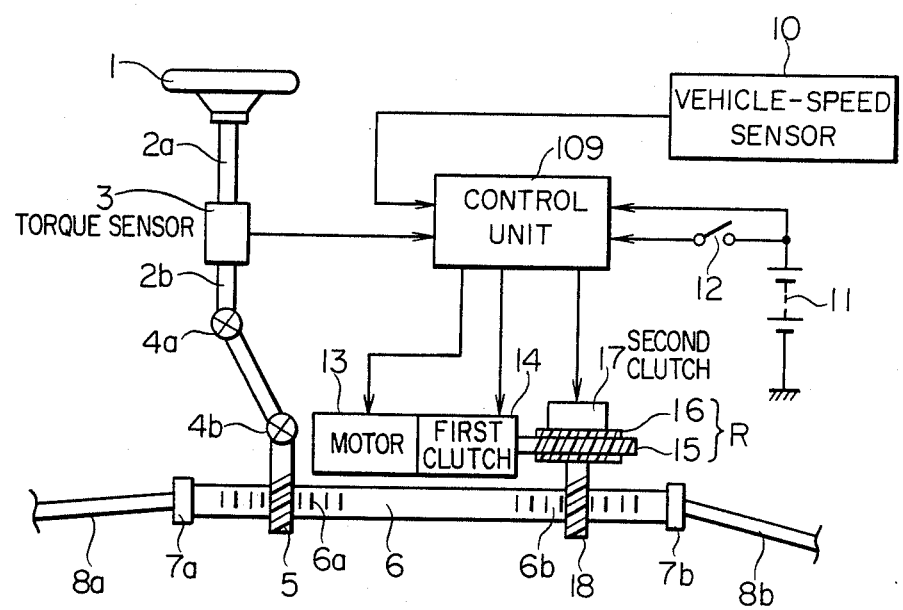

Referring to the drawings and first to FIG. 1, there is schematically shown a motor-driven power steering system constructed in accordance with the present invention. In FIG. 1, the motor-driven power steering system illustrated includes a steering wheel 1; a steering shaft 2 fixedly connected at its upper end with the steering wheel for integral rotation therewith; a torque sensor 3 mounted on the steering shaft 2 for detecting operator-induced steering torque resulting from steering force extended on to the steering wheel 1 by an operator and generating an output signal representative of the detected steering torque, the steering shaft 2 including an upper section 2a and a lower section 2b joined with each other through a first universal joint 4a; a first pinion 5 operatively connected at its upper end with the the lower end of the steering shaft 2 through a second universal joint 4b; a rack 6 operatively connected at its opposite ends through ball joints 7a, 7b with tie rods 8a, 8b which are in turn connected with a pair of steerable road wheels (not shown), the rack 6 having a first tooth portion 6a in mesh with the first pinion 5 and a second tooth portion 6b axially spaced from or otherwise continuous with the first tooth portion 6a; a vehicle-speed sensor 10 for detecting the travelling speed of a vehicle and generating an output signal representative of the detected vehicle speed; a battery 11 mounted on the vehicle; a key or ignition switch 12; a second pinion 18 in meshing engagement with the second rack tooth portion 6b on the rack 6; a motor 13 in the form of a direct current motor having a field coil 13a and an armature (not shown) both connected to be energized by a battery 11, the motor 13 being operatively connected through a speed-reduction gear R with the second pinion 18 for power assisting the steering motion of the rack 6 induced by the operator; a first electromagnetic clutch 14 interposed between the motor 13 and the second pinion 18 for transmitting power-assisting force therebetween substantially in proportion to the current supplied thereto, the first clutch 14 being preferably in the form of an electromagnetic sliding clutch such as, for example, a powder clutch, a hysteresis clutch or the like and directly coupled, in the illustrated embodiment, with an output shaft of the motor 13; a second clutch 17 in the form of an electromagnetic switching clutch interposed between the motor 13 and the second pinion 18 for selectively establishing and interrupting an operative connection therebetween; and a control unit 109 connected to receive output signals from the vehicle-speed sensor 10 and the torque sensor 3 for controlling the operations of the motor 13 and the first and second clutches 14 and 17. In the illustrated embodiment, the speed-reduction gear R comprises a worm 15 operatively connected with an output shaft of the first sliding clutch 14, and a worm wheel 16 in the form of a nut in mesh with the worm 15. The second electromagnetic switching clutch 17 serves to mechanically couple or disconnect the worm wheel 16 with the second pinion 18.

Figure 2:
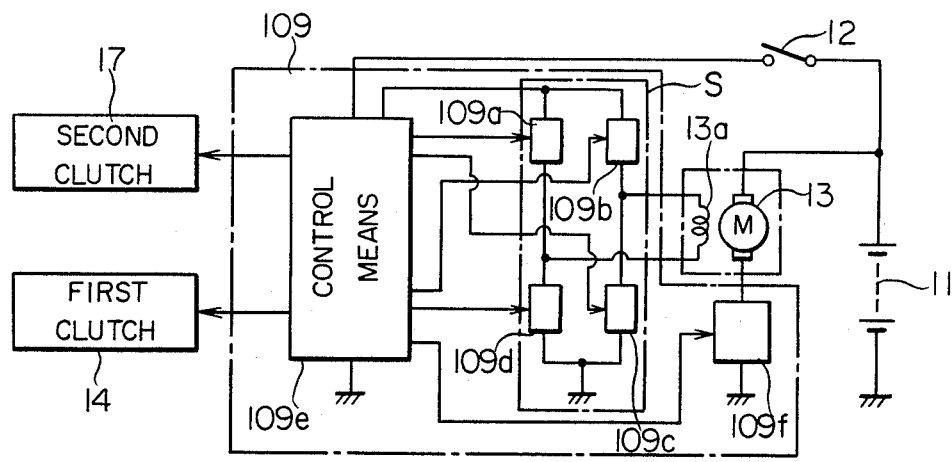

According to the present invention, as clearly shown in FIG. 2, the control unit 109 includes a first electric switching means S for controlling current to be supplied to the field coil 13a of the motor 13 so as to change the polarity of the field coil 13a and hence the rotational direction of the motor 13, a second electric switching means 109f such as a power transistor, a power MOS FET, or the like for controlling current supplied to an armature of the motor 13 so as to control the operation of the motor 13, and a control means 109e connected to receive the outputs from the torque sensor 3 and the vehicle-speed sensor 10 for controlling the operations of the first and second electric switching means S and 109f as well as the operations of the first and second clutches 14 and 17. More specifically, the first electric switching means S comprises a first electric switching element 109a connected at its input side to a positive terminal of the battery 11 and at its output side to one end of the field coil 13a, a second electric switching element 109b connected at its input side to the positive terminal of the battery 11 and at its output side to the other end of the field coil 13a, a third electric switching element 109c connected at its input side to the other end of the field coil 13a and at its output side to a negative terminal of the battery 11, and a fourth electric switching element 109d connected at its input side to the one end of the field coil 13a and at its output side to the negative terminal of the battery 11. Each of the electric switching elements 109a through 109d may be a power transistor or a power MOS FET. The first and third electric switching elements 109a and 109c are simultaneously energized or deenergized by the control means 109e, and the second and fourth electric switching elements 109b and 109d are simultaneously energized or deenergized by the control means 109e but alternatively with respect to the first and third electric switching elements. Thus, when the pair of first and third electric switching elements 109a and 109c are energized by the action of the control means 109e, current is supplied from the battery 11 to the field coil 13a via the key switch 12, the control means 109e and the first electric switching element 109a, and returned from the field coil 13a to the battery 11 via the third electric switching element 109c. On the other hand, when the pair of second and fourth electric switching elements 109b and 109d are energized by the action of the control means 109e, current is supplied from the battery 11 to the field coil 13a via the key switch 12, the control means 109e and the second electric switching element 109b, and returned from the field coil 13a to the battery 11 via the fourth electric switching element 109d. In this manner, the polarity of the field coil 13a is reversed to thereby change the rotational direction of the motor 13. Here, it is to be noted that current supplied to the field coil 13a, being generally about 1 to 3 amperes, is far smaller than that supplied to the armature of the motor 13, which is about 10 to 80 amperes. Accordingly, it is possible to substantially reduce the manufacturing costs and the sizes of the electric switching elements 109a through 109d as compared with those of 9a through 9d employed in the conventional control unit 9 for controlling the current supplied to the armature of the motor 13.

Figure 4:
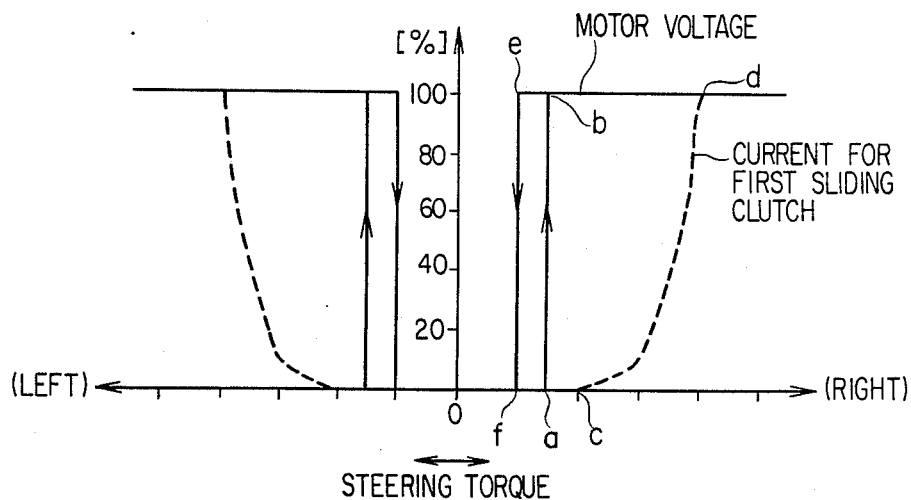

In operation, the control unit 109 operates to control the operations of the motor 13 and the first electromagnetic sliding clutch 14 in the manner as illustrated in FIG. 4. First, let us consider the case in which a vehicle is stationary or standing still. In this case, when the key switch 12 is first turned on to start the engine, the second electromagnetic clutch 17 is automatically actuated to place the second pinion 18 into mechanical coupling with the worm wheel 16. In this state, when the steering wheel 1 is turned by an operator, the control unit 109 acts to control the operations of the motor 13 and the sliding clutch 14 in the manner as illustrated in FIG. 4. More specifically, when steering torque increases in the righthand direction to point a in FIG. 4, the pair of first electric switching elements 109a and 109b or alternatively the pair of first electric switching elements 109c and 109d as illustrated in FIG. 2 are energized by the control means 109e to supply current to the field coil 13a, and at the same time, the second electric switching element 109f is also energized by the control means 109e to supply current to the armature of the motor 13 so that the motor 13 is turned on and imposed with 100% voltage at point b. As the steering torque further increases, current begins to flow through the first electromagnetic sliding clutch 14 at point c and the current increases logarithmically with respect to an increase in the steering torque, and reaches 100% current at point d. On the other hand, as the steering torque decreases, current flowing through the first electromagnetic sliding clutch 14 begins to decrease at point d and reaches 0% current at point c. In accordance with a further decrease in the steering torque, the motor 13 is turned off at point e so that the voltage imposed on the motor 13 becomes 0% at point f. Similar to this, the motor 13 and the first electromagnetic sliding clutch 14 are controlled in the same manner when the steering torque increases or decreases in the lefthand direction.

Figure 3:
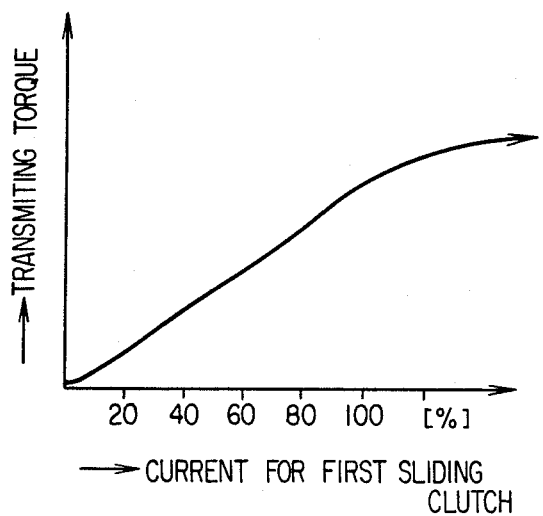

As shown in FIG. 3, the characteristic of the first sliding clutch 14 is used in a range in which transmitting torque or sliding torque increases substantially in direct proportion to clutch current. Accordingly, as is clear from FIG. 4, the motor 13 is imposed with 100% voltage through the second switching element 109f and energized to start rotating when steering torque increases to point a. As the steering torque further increases, current flowing through the first sliding clutch 14 begins to gradually increase at point c so that the output torque transmitted from the first sliding clutch 14 to the worm 15 increases gradually. As a result, auxiliary torque having the intensity corresponding to the steering force exerted on the steering wheel 1 by an operator is transmitted from the motor 13 to the second tooth portion 6b on the rack 6 via the first sliding clutch 14, the worm wheel 16, the second electromagnetic clutch 17 and the second pinion 18, thereby making the steering operation for the operator lighter.

Figure 5:
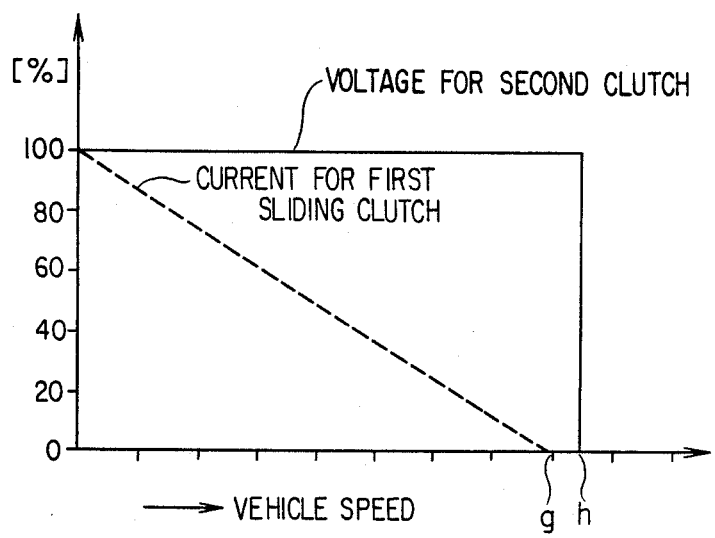

Now, let us consider the case in which the vehicle is travelling. In this case, as seen from FIG. 5, current flowing through the first sliding clutch 14 is controlled by the control means 109e so that it decreases in inverse proportion to an increase in vehicle speed. Thus, the sliding clutch current becomes 0% at point g in FIG. 5. That is, even if steering force is exerted on the steering wheel 1 by an operator, current flowing through the first sliding clutch 14 becomes zero. When the vehicle speed increases to point h in FIG. 5, the second electromagnetic clutch 17 is deactuated or turned off so that engagement or mechanical coupling between the worm wheel 16 and the second pinion 18 is released or disconnected. As a consequence, when turning the steering wheel 1, the operator only feels a load which is caused by the meshing engagement between the second rack tooth portion 6b and the second pinion 18. In other words, the steering system simply becomes a manual steering without power assistance. On the other hand, when the vehicle speed decreases, the control unit 109 operates such that the second electromagnetic clutch 17 is actuated or turned on at point h to provide mechanical coupling between the second pinion 18 and the worm wheel 16, and then current flowing through the first sliding clutch 14 is gradually increased from point g.

What is claimed is:

1. A motor-driven power steering system for a vehicle having a steering wheel operatively connected to steer steerable road wheels, said motor-driven power steering system comprising:

a torque sensor connected to detect operator-induced steering torque resulting from steering force exerted on said steering wheel by an operator and generating a voltage signal representative thereof;

a motor having a field coil and an armature and connected to transmit a rotating force to said steerable road wheels for power-assisting steering motion caused by the operator through said steering wheel, said field coil of said motor having first and second ends and being energized by a battery;

an electric switching means interposed between said battery and said field coil of said motor for controlling supply of current to said field coil so as to change rotational direction of said motor; and a control means connected to receive said voltage signal from said torque sensor for controlling switching operation of said electric switching means.

2. A motor-driven power steering system for a vehicle according to claim 1 wherein said electric switching means comprises:

a first electric switching element connected at an input side to a positive terminal of said battery and at an output side to the first end of said field coil;

a second electric switching element connected at an input side to the positive terminal of said battery and at an output side to the second end of said field coil;

a third electric switching element connected at an input side to the second end of said field coil and at an output side to a negative terminal of said battery;

a fourth electric switching element connected at an input side to the first end of said field coil and at an output side to the negative terminal of said battery;

whereby said first and third electric switching elements are simultaneously energized and deenergized by said control means, and said second and fourth electric switching elements are simultaneously energized and deenergized alternatively with respect to said first and third electric switching elements by said control means.

3. A motor-driven power steering system for a vehicle according to claim 2 wherein each of said electric switching elements comprises a power transistor.

4. A motor-driven power steering system for a vehicle according to claim 2 wherein each of said electric switching elements comprises a power MOS FET.

5. A motor-driven power steering system for a vehicle having a steering wheel operatively connected to steer steerable road wheels, said motor-driven power steering system comprising:

a torque sensor connected to detect operator-induced steering torque resulting from steering force exerted on said steering wheel by an operator and generating a voltage signal representative thereof;

a motor having a field coil and an armature and connected to transmit a rotating force to said steerable road wheels for power-assisting steering motion caused by the operator through said steering wheel, said field coil of said motor having first and second ends and being energized by a battery;

an electric switching means interposed between said battery and said field coil of said motor for controlling supply of current to said field coil so as to change rotational direction of said motor;

a first electric switching element connected at an input side to a positive terminal of said battery and at an output side to the first end of said field coil;

a second electric switching element connected at an input side to the positive terminal of said battery and at an output side to the second end of said field coil;

a third electric switching element connected at an input side to the second end of said field coil and at an output side to a negative terminal of said battery;

a fourth electric switching element connected at an input side to the first end of said field coil and at an output side to the negative terminal of said battery; and control means interposed between said first and second electric switching elements and the positive terminal of said battery and connected to receive said voltage signal from said torque sensor for controlling switching operation of said electric switching means whereby said first and third electric switching elements are simultaneously energized or deenergized by said control means, and said second and fourth electric switching elements are simultaneously energized or deenergized alternatively with respect to said first and third electric switching elements by said control means.

6. A motor-driven power steering system for a vehicle having a steering wheel operatively connected to steer steerable road wheels, said motor-driven power steering system comprising:

a torque sensor connected to detect operator-induced steering torque resulting from steering force exerted on said steering wheel by an operator and generating a voltage signal representative thereof;

a motor having a field coil and an armature rotating and connected to transmit a rotating force to said steerable road wheels for power-assisting steering motion caused by the operator through said steering wheel, said field coil of said motor having first and second ends and being energized by a battery;

a first electric switching means connected between said battery and said field coil of said motor for controlling current to be supplied to said field coil so as to change rotational direction of said motor;

a control means connected to receive said voltage signal from said torque sensor for controlling switching operation of said electric switching means; and a second electric switching means interposed between said armature of said motor and said battery and adapted to be controlled by said control means for controlling the supply of current to said armature.

7. A motor-driven power steering system for a vehicle according to claim 6 wherein said control electric switching means comprises a power transistor.

8. A motor-driven power steering system for a vehicle according to claim 6 wherein said control electric switching means comprises a power MOS FET.

9. A motor-driven power steering system for a vehicle comprising:
- a steering wheel;
- a steering shaft fixedly connected with said steering wheel for integral rotation therewith;
- a speed sensor for detecting travelling speed of a vehicle and generating an output signal representative of the detected vehicle speed;
- a torque sensor mounted on said steering shaft for detecting operator-induced steering torque resulting from steering force exerted on said steering wheel by an operator and generating an output signal representative of the detected steering torque;
- a first pinion operatively connected with said steering shaft and adapted to be driven by said steering wheel through an intermediary of said steering shaft;
- a rack operatively connected through tie rods with a pair of steerable road wheels and having a first rack tooth portion and a second rack tooth portion formed thereon, said first rack tooth portion being in meshing engagement with said first pinion;
- a second pinion being in meshing engagement with said second rack tooth portion on said rack;
- a motor having a field coil and an armature adapted to be energized by a battery, said motor being operatively connected through a speed-reduction gear with said second pinion for power assisting steering motion of said rack induced by the operator through the intermediary of said steering wheel, said steering shaft, said first pinion, and said first rack tooth portion, said field coil of said motor having first and second ends;
- a first electromagnetic sliding clutch interposed between said motor and said second pinion for transmitting power therebetween substantially in proportion to intensity of current supplied thereto;
- a second electromagnetic switching clutch interposed between said motor and said second pinion for selectively establishing or disconnecting the operative connection between said motor and said second pinion;
- a first electric switching means interposed between the battery and said field coil of said motor for controlling supply of current to said field coil so as to change rotational direction of said motor; and
- a control means connected to receive output signals from said speed sensor and said torque sensor for controlling the operations of said motor, said first electric switching means, said first clutch, and said second clutch.

10. A motor-driven power steering system for a vehicle according to claim 9 wherein said first electric switching means comprises:
- a first electric switching element connected at an input side to a positive terminal of said battery and at an output side to the first end of said field coil;
- a second electric switching element connected at an input side to the positive terminal of said battery and at an output side to the second end of said field coil;
- a third electric switching element connected at an input side to the second end of said field coil and at an output side to a negative terminal of said battery; and
- a fourth electric switching element connected at an input side to the first end of said field coil and at an output side to the negative terminal of said battery;
- whereby said first and third electric switching elements are simultaneously energized or deenergized by said control means, and said second and fourth electric switching elements are simultaneously energized or deenergized alternatively with respect to said first and third electric switching elements by said control means.

11. A motor-driven power steering system for a vehicle according to claim 10 wherein each of said electric switching elements comprises a power transistor.

12. A motor-driven power steering system for a vehicle according to claim 10 wherein each of said electric switching elements comprises a power MOS FET.

13. A motor-driven power steering system for a vehicle according to claim 10 wherein said control means is interposed between said first and second electric switching elements and the positive terminal of said battery.

14. A motor-driven power steering system for a vehicle according to in claim 9 further comprising a second electric switching means interposed between said armature of said motor and said battery and controlled by said control means for controlling supply of current to said armature.

15. A motor-driven power steering system for a vehicle as according to claim 14 wherein said control electric switching means comprises a power transistor.

16. A motor-driven power steering system for a vehicle according to claim 14 wherein said control electric switching means comprises a power MOS FET.

* * * * *